United States Patent [19]

Freude

[11] 4,199,765
[45] Apr. 22, 1980

[54] PRINTING DEVICE FOR MULTIPLE RECORDERS

[75] Inventor: Paul Freude, Düren-Birgel, Fed. Rep. of Germany

[73] Assignee: DIA-NIELSEL GmbH Zubehör für die Messtechnik, Düren, Fed. Rep. of Germany

[21] Appl. No.: 909,738

[22] Filed: May 25, 1978

[30] Foreign Application Priority Data

Jun. 4, 1977 [DE] Fed. Rep. of Germany ....... 2725456

[51] Int. Cl.$^2$ ............................................. G01D 9/34
[52] U.S. Cl. ..................... 346/61; 346/141; 101/99; 400/160; 64/DIG. 2; 74/84
[58] Field of Search ................... 101/93.30, 93.31, 99, 101/316; 400/160, 161; 64/DIG. 2; 74/84; 346/61, 141

[56] References Cited

U.S. PATENT DOCUMENTS

| | | | |
|---|---|---|---|
| 1,636,262 | 7/1927 | Troendly | 64/DIG. 2 |
| 3,144,296 | 8/1964 | Hohl | 346/141 |
| 3,318,430 | 5/1967 | Boyd | 400/160 |
| 3,406,807 | 10/1968 | Sasaki et al. | 400/160 |
| 3,557,694 | 1/1971 | Wallace et al. | 400/175 |
| 3,693,180 | 9/1972 | Hasebe et al. | 346/141 |
| 3,738,264 | 12/1973 | Sobottka et al. | 101/99 |
| 3,769,626 | 10/1973 | McClenahan | 346/61 |
| 3,814,229 | 6/1974 | Kohlhage | 400/160 |
| 3,872,789 | 3/1975 | Ambrosio | 346/141 |
| 3,973,488 | 8/1976 | Meelke | 101/99 |

*Primary Examiner*—William Pieprz
*Attorney, Agent, or Firm*—John C. Smith, Jr.

[57] ABSTRACT

A multiple recorder printing device for recording values of variable amounts on a moving recording tape in the form of consecutive symbols of the same or different colors includes a driven common drive means to both rotate the rotary printing head and move the printing head toward and away from the recording tape. The drive means permits rotation of the rotary printing head to be momentarily arrested during the period that a printing tip on the rotary printing head is in contact with the recording tape to assure clear printing on the recording tape without smudging.

11 Claims, 3 Drawing Figures

PRINTING DEVICE FOR MULTIPLE RECORDERS

BACKGROUND OF THE INVENTION

This invention relates to a printing device for multiple recorders wherein values of variable amounts are recorded of a moving recording tape in the form of consecutive symbols, e.g. dots, in one or several colors.

Printing devices of the type described herein include a rotary printing head which is adapted to be periodically moved toward and away from the recording tape and has a plurality of spaced printing tips or pins about its periphery. The printing head must be arranged such that while a printing tip is in contact with the recording tape, rotation of the printing head is arrested to avoid smudges. In the prior art this has required a complex drive unit including separate independent drive means for the rotating movement and for the lifting and lowering movement, respectively. A chopper bar or a rocker is provided to press down the printing head during the printing operation and a further mechanism is provided to lift the printing head following the printing operation. Thus, it will be appreciated that the drive mechanisms of prior art printing devices for multiple recorders have been relatively complex.

It is an object of the present invention to provide a printing device for multiple recorders in which the drive mechanism for the printing head is substantially simplified with respect to both the lowering and lifting movement and the rotating movement of the printing head.

SUMMARY OF THE INVENTION

In accordance with the present invention, the rotating movement of the printing head, as well as its lifting and lowering movements during the printing operation, are all directly derived from a continuously rotating drive rod. A cam plate supported on the drive rod controls a rocking lever by which the lifting and lowering movements of the printing head are affected. A pinion, also supported on the drive rod, and a series of gears also serve to rotate the printing head, provision being made for rotation of the printing head to be arrested momentarily during each succeeding printing operation.

DETAILED DESCRIPTION OF THE INVENTION

Figure 1:
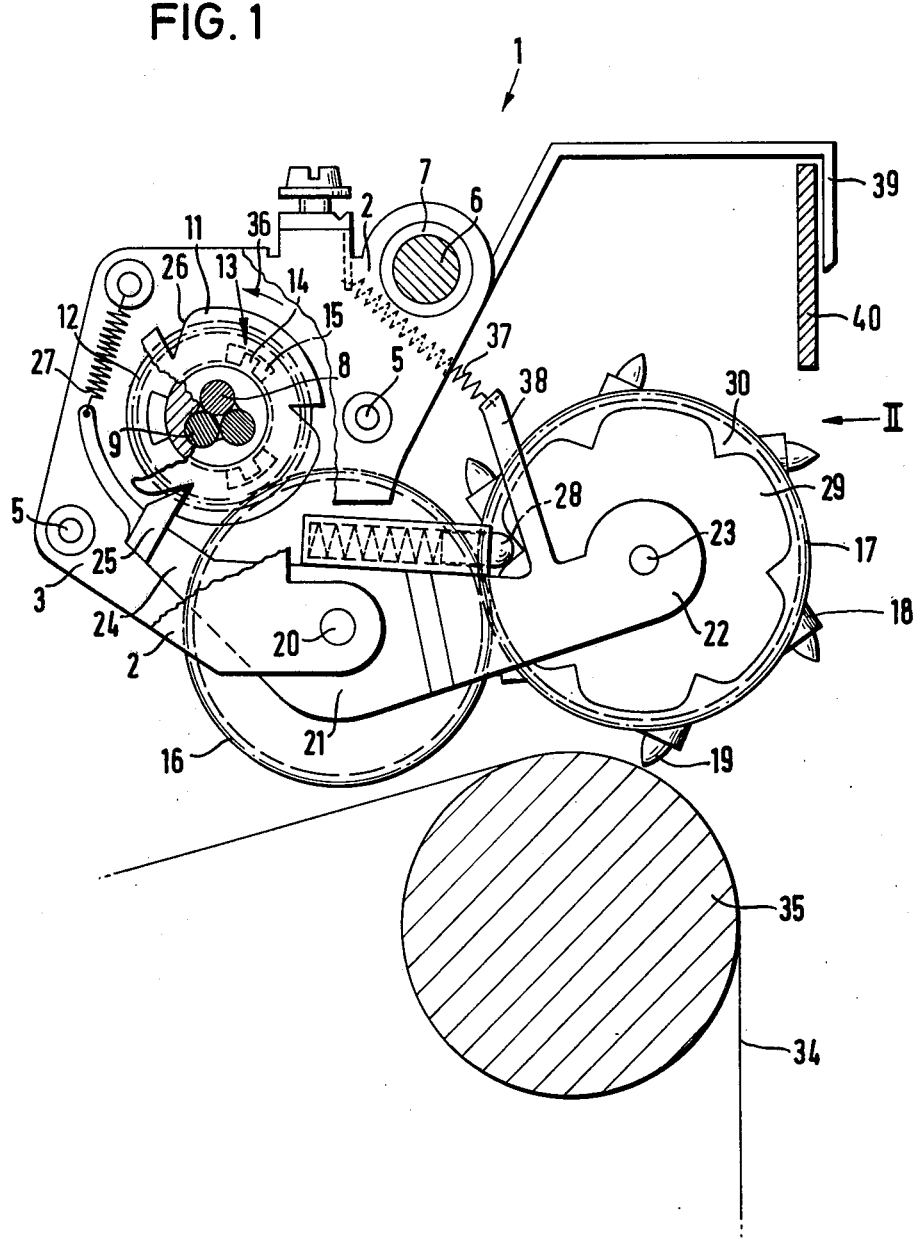
FIG. 1 is a side view, partially in cross-section, showing the construction of the printing device in accordance with the invention.
Figure 2:
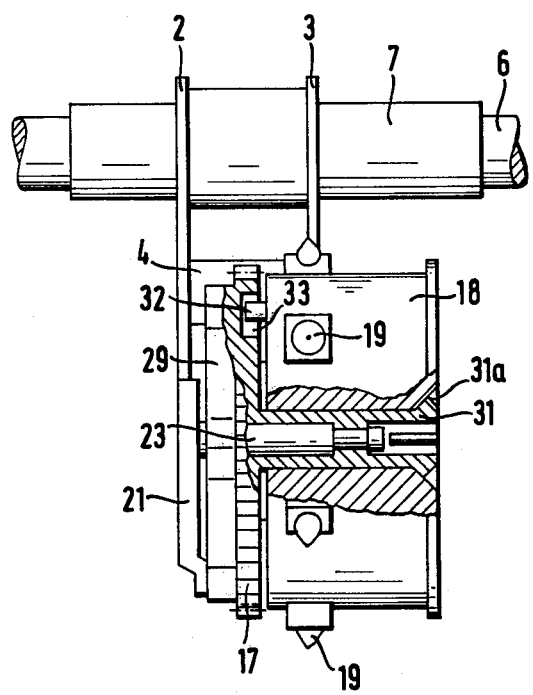
FIG. 2 is a partial front view, partly in cross-section, of the printing device of FIG. 1 taken in the direction of arrow II of FIG. 1.
Figure 3:
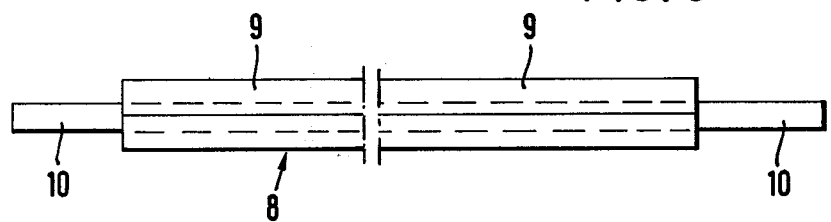
FIG. 3 is a schematic view of the drive rod.

Referring to the drawings, a pair of plates 2 and 3 are secured together in spaced relation by distance bushings 4 and bolts 5 to form a basic support structure. This support structure may be moved axially on a guide rod 6 guided in a sleeve 7 firmly connected with the structure. The printing device is driven by rod 8 on which the structure is supported. The drive rod is formed preferably of three individual round section rods 9 held in position by pins 10 adjacent the ends of the rods. The three round section rods 9 are arranged to form a triangular configuration to simplify transfer of torque.

A cam plate 11 which is driven by drive rod 8 contains on its periphery half as many recesses as there are printing tips on the periphery of the printing head to be described subsequently. A pinion 12 is mounted on the hub of the cam plate 11 with means 13 interposed between the cam plate 11 and the pinion 12 permitting limited free relative rotation between the cam plate and the pinion. This means may be in the form of a projection 14 on one part (cam plate 11 or pinion 12) which engages a limited recess 15 of the other part (cam plate 11 or pinion 12) extending in the peripheral direction.

Printing head 18 which is provided with spaced printing tips 19 about its periphery is attached to gear 17 which is driven through intermediate gear 16 by pinion 12. A rocking lever 21 is pivotally supported on shaft 20 which also rotatably supports the intermediate gear 16. One arm 20 of the rocking lever 21 carries a shaft 23 supporting the printing head 18. The other arm 24 of the rocking lever 21 includes a nose 25 adapted to engage the notches 26 of the cam plate 11. The rocking lever 21 may be biased in one pivotal direction by spring 27 if the printing device is arranged vertically as shown in the figures. The spring, however, is unnecessary if the printing device is arranged horizontally.

A biased stop bolt 28 mounted on the arm 24 of the rocking lever 21 is adapted to cooperate with notches 30 of a stop plate 29 secured to gear 17. The printing head 18 may be attached in the axial direction to the hub 31 of the gear 17 by a snap seat 31a. Concurrent rotation of the printing head 18 and the gear 17 is assured by a pin 32 on the printing head which engages in a recess of the gear 17. With this arrangement the printing head 18 is easily exchanged for a different printing head.

A recording tape 34 is guided via a roll 35 such that the printing tips 19 on the printing head 18 will contact the recording tape 34 during each printing operation.

It will be appreciated that the drive rod 8 serves both to rotate and to raise and lower the printing head 18. Upon rotation of the drive rod 8 the pinion 12 is rotated via cam plate 11 in the direction of arrow 36. This rotation is transmitted via intermediate gear 16 to gear 17 to rotate the printing head 18 in an anti-clockwise direction to position successive printing pins 19. Pivotal movement of the rocking lever 21, caused by the engagement of nose 25 with successive notches 26 of the cam plate 11, causes the printing head 18 to rise and fall during each printing operation. When the printing head 18 is moved toward the recording tape 34 to effect printing, the pinion 12 is rotated by the gear 17 via the intermediate gear 16 because the spring bolt 28 has, shortly before, engaged a notch 30 in stop plate 29, i.e., the pinion 12 is running in advance of the drive rotation direction by the interposed means 13 permitting limited relative rotation between the cam plate 11 and the pinion 12. As a result, the printing head 18 does not rotate during the actual printing when a printing tip 19 is in contact with the recording tape 34. To assure sufficient standstill time, a corresponding transmission ratio between the pinion 12 and gear 17 should be provided, i.e., at least a ratio of about 1:2. With the advance of the cam plate 12, the rocking lever 21 is pivoted to lift the printing head 18, the face of the notch 26 being pressed against the nose 25 of the rocking lever arm 24.

The printing head 18 is lowered under the action of spring 27. To break this lowering movement a tension spring 37 may be provided between the arm 22 of the rocking lever 21, or an extension thereof, and the support structure 2,3 so that the contact pressure of the printing tips on the recording tape 34 may be reduced.

The printing device may be provided with a pointer 39 which moves along a scale 40 simultaneously with displacement of the printing assembly.

The printing device is so designed that it can be easily converted by interchanging the cam plate, the stop plate and the printing head to change the number of printing tips on the printing head, e.g. from six to twelve (6-12) printing tips.

Preferably a substantial portion of the individual elements of the printing device may be made of lightweight plastic materials permitting quick setting time and a short dot sequence of the recorder.

The present invention assures precisely synchronization between the raising and lowering of the printing head and the intermittent stopping of rotation of the printing head. The interposed means permitting limited relative rotation between the cam plate 11 and the pinion 12 insures that movement of the rocking lever 21 causes advance of the pinion 12 in the drive direction thus assuring the required short standstill time of the rotational movement of the printing head necessary during printing on the recording tape. The mechanical arrangement is simple and reliable.

I claim:

1. A multiple recorder printing device for recording values of variable amounts on a moving recording tape in the form of consecutive symbols of different colors, said device comprising:
   (a) support means;
   (b) a rocking lever pivotally mounted on said support means for oscillating movement about an axis;
   (c) a unitary rotary printing head and gear rotatably mounted on an arm of said rocking lever at a position spaced from said pivot axis, said printing head including a plurality of spaced printing tips about its periphery;
   (d) a cam plate and a pinion mounted on said support means for rotation about a common axis spaced from said pivot axis, said cam plate having a plurality of recesses therein;
   (e) drive means for driving said cam plate;
   (f) means permitting free limited relative rotational play between said pinion and said cam plate;
   (g) an intermediate gear rotatably mounted at said pivot axis and engaging said pinion and gear whereby said drive means drives said printing head;
   (h) means on said rocking lever arranged to engage said cam plate including the succession of recesses therein as said cam plate rotates causing said rocking lever to oscillate and said printing head repeatedly to move towards and contact said recording tape and to move away from said recording tape as said cam plate rotates; and
   (i) detent means for stopping rotation of said printing head during movement of said printing head towards said recording tape and while each printing tip is in contact with said recording tape;
   (j) the amount of said free limited relative rotation between said pinion and said cam plate being sufficient such that the entering of said cam engaging means in a recess in said cam plate, and the resultant pivoting of said rocking lever, movement of said printing head towards said recording tape and contact of a printing tip with said recording tape while rotation of said printing head is stopped by said detent means, simultaneously causes the rotation of said pinion to be accelerated with respect to said cam plate and any further rotation of said pinion and printing head to be suspended until after said printing head has been moved away from said recording tape.

2. A printing device according to claim 1 wherein said means permitting free limited relative rotational play between said pinion and said cam plate comprises an elongated recess in one of said cam plate and pinion and a projection on the other of said cam plate and pinion extending into said recess whereby said projection may move within said recess along the length thereof.

3. A printing device according to any one of claims 1 and 2 wherein said detent means for preventing rotation of said printing head comprises a stop plate rotatably mounted integral with said printing head and having a plurality of recesses about the periphery thereof equal to the number of printing tips on said printing head and a spring biased element on said rocking lever for engaging said recesses in said stop plate.

4. A printing device according to claim 3 wherein said drive means comprises three parallel round section rods arranged in a triangular configuration and adapted to engage a corresponding aperture in said cam plate, said cam plate being axially slidable along said three parallel round section rods.

5. A printing device according to claim 4 wherein said three parallel round section rods are connected at opposite ends thereof by pins.

6. A printing device according to claim 3 further comprising means biasing said printing head toward said recording tape.

7. A printing device according to claim 6 further comprising means braking the movement of said rocking lever toward said recording tape.

8. A printing device according to claim 7 wherein said means braking the movement of said rocking lever toward said recording tape comprises a tension spring extending between the arm of said rocking lever and said support means.

9. A printing device according to any one of claims 1 and 2 the transmission ratio between said pinion and said gear is at least 1:2.

10. A printing device according to any one of claims 1 and 2 wherein said gear includes a hub and said device further comprises means for releasably securing said printing head to said hub whereby printing heads may be interchanged.

11. A printing device according to claim 10 wherein said means for releasably securing said printing head to said hub comprises a snap seat on said hub on which said printing head is mounted and a recess in said gear spaced from the rotational axis thereof for engagement by a pin on said printing head.

* * * * *